US009550926B2

(12) United States Patent
Park et al.

(10) Patent No.: US 9,550,926 B2
(45) Date of Patent: Jan. 24, 2017

(54) TOUCH PANEL

(71) Applicant: LG CHEM, LTD., Seoul (KR)

(72) Inventors: Min Soo Park, Daejeon (KR); Se Woo Yang, Daejeon (KR); Suk Ky Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 98 days.

(21) Appl. No.: 14/158,228

(22) Filed: Jan. 17, 2014

(65) Prior Publication Data
US 2014/0134433 A1    May 15, 2014

Related U.S. Application Data

(63) Continuation of application No. PCT/KR2012/005787, filed on Jul. 19, 2012.

(30) Foreign Application Priority Data

Jul. 19, 2011  (KR) .................. 10-2011-0071452
Jul. 19, 2012  (KR) .................. 10-2012-0078765

(51) Int. Cl.
*B32B 7/12* (2006.01)
*C09J 133/12* (2006.01)

(52) U.S. Cl.
CPC ......... *C09J 133/12* (2013.01); *Y10T 428/2891* (2015.01)

(58) Field of Classification Search
None
See application file for complete search history.

(56) References Cited

U.S. PATENT DOCUMENTS

| | | | | | |
|---|---|---|---|---|---|
| 4,565,854 | A | * | 1/1986 | Sato | C08F 2/38 526/214 |
| 5,667,858 | A | * | 9/1997 | Pokorny | C09J 7/0214 428/343 |
| 6,293,037 | B1 | * | 9/2001 | Spada | C08F 220/18 40/638 |
| 6,559,902 | B1 | * | 5/2003 | Kusuda | G06F 3/045 349/12 |
| 2003/0215630 | A1 | * | 11/2003 | Melancon | C09J 7/0217 428/355 AC |
| 2005/0065252 | A1 | * | 3/2005 | Kawamura | C08K 5/0025 524/261 |
| 2005/0261433 | A1 | * | 11/2005 | Takeko | C08F 220/18 525/222 |
| 2006/0057366 | A1 | * | 3/2006 | Husemann | C09J 133/06 428/343 |
| 2009/0087629 | A1 | * | 4/2009 | Everaerts | B32B 7/12 428/203 |
| 2010/0167050 | A1 | * | 7/2010 | Husemann | C08F 20/12 428/355 AC |
| 2010/0215955 | A1 | | 8/2010 | Kishioka | |
| 2011/0139347 | A1 | * | 6/2011 | Kim | C09J 7/0246 156/154 |
| 2011/0159225 | A1 | * | 6/2011 | Boyle | C09J 7/0225 428/41.8 |

FOREIGN PATENT DOCUMENTS

| | | | |
|---|---|---|---|
| CN | 1599780 A | 3/2005 | |
| CN | 101921552 A | 12/2010 | |
| EP | 1574557 A | 9/2005 | |
| EP | 1574557 A1 * | 9/2005 | ............... B32B 7/12 |
| JP | 2005-255877 A | 9/2005 | |
| JP | 2008037959 A | 2/2008 | |
| JP | 2010-195942 A | 9/2010 | |
| JP | 2011-501767 A | 1/2011 | |
| JP | 2011-21179 A | 2/2011 | |
| JP | 2011-132354 A | 7/2011 | |
| KR | 10-2000-0005235 A | 1/2000 | |
| KR | 10-2007-0021128 A | 2/2007 | |
| WO | 2009/045889 A2 | 4/2009 | |
| WO | WO 2009139584 A2 * | 11/2009 | ............... C09J 4/06 |
| WO | 2010/040014 A1 | 4/2010 | |

OTHER PUBLICATIONS

Ryu, Takeatsu et al., "Optical film with pressure sensitive adhesive agent and optical laminate", English translation of JP 2008-176173A, Jul. 31, 2008.*

* cited by examiner

Primary Examiner — Anish Desai
(74) Attorney, Agent, or Firm — Dentons US LLP

(57) ABSTRACT

Provided is a touch panel. The touch panel includes a base and a pressure-sensitive adhesive layer attached to the base and including an acryl-based polymer containing an acryl polymer containing 5 to 30 parts by weight of isobornyl (meth)acrylate, and 5 to 40 parts by weight of methyl (meth)acrylate in a polymerized form. Accordingly, it can effectively inhibit penetration of oxygen, moisture or other impurities at an interface between the base and the pressure-sensitive adhesive layer, or at an interface between a conductor thin film and the pressure-sensitive adhesive layer, and prevent degradation in optical properties such as visibility, etc. due to bubbles generated at the pressure-sensitive adhesive interface. In addition, when the pressure-sensitive adhesive layer is directly attached to the conductor thin film and even exposed to severe conditions such as high temperature or high temperature and high humidity, a change in the resistance of the conductor thin film may be effectively inhibited, and thus the touch panel can be stably driven for a long time.

5 Claims, 2 Drawing Sheets

TOUCH PANEL

This application is a Continuation Bypass Application of International Patent Application No. PCT/KR2012/005787, filed on Jul. 19, 2012, which claims priority to and the benefit of Korean Patent Application Nos. 10-2011-0071452, filed on Jul. 19, 2011 and 10-2012-0078765, filed on Jul. 19, 2012, in the Korean Intellectual Property Office, all of which are hereby incorporated by reference.

BACKGROUND

1. Field of the Invention

The present invention relates to a touch panel, a pressure-sensitive adhesive composition for a touch panel, a double-sided pressure-sensitive adhesive tape using the same, and a method of preparing a pressure-sensitive adhesive composition for a touch panel.

2. Discussion of Related Art

A touch panel or touch screen is applied to various data processing terminals such as a mobile communication terminal or ATM, or displays such as a TV or monitor. In addition, as the touch panel is increasingly applied to compact portable electronic devices, the demand for a more compact and lighter touch panel or screen is increasing.

To configure the touch panel or screen, a pressure-sensitive adhesive is used. Such a pressure-sensitive adhesive should maintain transparency under severe conditions such as high temperature or high temperature and high humidity, have high peel strength, and inhibit lift-off and peeling. In addition, it is required that the pressure-sensitive adhesive effectively inhibits bubble generation which becomes a more frequent problem when a plastic film is used as a base.

Moreover, according to the structure of a touch panel or touch screen, when a pressure-sensitive adhesive is directly adhered to a conductor thin film such as an indium tin oxide (ITO) thin film, the pressure-sensitive adhesive also needs to have a characteristic of inhibiting a change in the resistance of a conductor thin film to stably drive the panel even when being used for a long time.

SUMMARY OF THE INVENTION

The present invention is directed to providing a touch panel, a pressure-sensitive adhesive composition for a touch panel, a double-sided pressure-sensitive adhesive tape using the same and a method of preparing a pressure-sensitive adhesive composition for a touch panel.

In one aspect, a touch panel includes a base, and a pressure-sensitive adhesive layer attached to the base. The pressure-sensitive adhesive layer may include an acryl polymer containing 5 to 30 parts by weight of isobornyl (meth)acrylate and 5 to 40 parts by weight of methyl (meth)acrylate in a polymerized form.

Hereinafter, the present invention will be described in detail.

The touch panel of the present invention may include a pressure-sensitive adhesive without limitation, and may include a structure of a general material. For example, the touch panel of the present invention may be a resistive type touch panel or an electrostatic capacity-type touch panel.

The basic structure the touch panel according to the present invention is shown in FIG. 1.

The structure shown in FIG. 1 may include a base 12 and a pressure-sensitive adhesive film 11 attached to one surface of the base 12. The base may be formed of a plastic film.

In one exemplary embodiment of the present invention, the touch panel, as shown in FIG. 2, may have a structure in which a plastic base film 24 having a conductor thin film 22 formed on one surface thereof and a substrate 23 are attached by means of a pressure-sensitive adhesive layer 21.

Meanwhile, in another exemplary embodiment of the present invention, the touch panel, as shown in FIG. 3, may be formed in a multi-layered structure having a multi-touch function, in which a plastic base film 36 having a conductor thin film 33 and a substrate 35 are attached by means of a pressure-sensitive adhesive layer 31, and the plastic base film 36 is further attached to another plastic base film 37 having another conductor thin film 34 by means of a pressure-sensitive adhesive layer 32.

The kind of base included in the touch panel of the present invention (e.g., reference numerals 12 in FIG. 1, 24 in FIG. 2, or 36 or 37 in FIG. 3) is not specifically limited. In the present invention, any one of transparent films may be used as the base without limitation, and examples of the base may be a polyester film, an acryl resin film, a polycarbonate film, a polyamide film, a polyvinylchloride film, a polystyrene film, a polyolefin film such as a polyethylene or polypropylene film, and preferably, a polyester film such as a polyethyleneterephthalate film or a polycarbonate film.

In addition, the kind of substrate included in the touch panel of the present invention (e.g., reference numerals 23 in FIG. 2, or 35 in FIG. 3) is not specifically limited, and thus any one of substrates having transparency, for example, glass or plastic, may be used without limitation.

In the present invention, the thickness of the base is not specifically limited, and may be suitably designed according to a place to which the base is applied. For example, the base may have a thickness of approximately 3 to 300 μm, preferably, approximately 5 to 250 μm, and more preferably, 10 to 200 μm.

In addition, the base or the conductor thin film formed on the substrate may be formed of a conventional thin film-forming method such as vacuum deposition, sputtering, ion plating, spray pyrolysis, chemical plating, electric plating, or a combination of at least two thereof, and preferably vacuum deposition or sputtering.

The conductor thin film may be formed of a metal such as gold, silver, platinum, palladium, copper, aluminum, nickel, chromium, titanium, iron, cobalt, tin or an alloy of at least two thereof, a metal oxide such as indium oxide, tin oxide, titanium oxide, cadmium oxide or a mixture of at least two thereof, or another metal oxide such as copper iodide. The conductor thin film may be a crystal or amorphous layer. In the present invention, the conductor thin film is preferably formed of indium tin oxide (ITO), but the present invention is not limited thereto. In addition, the thickness of the conductor thin film may be controlled to approximately 10 to 300 nm, and preferably approximately 10 to 200 nm, in consideration of the probability of forming a continuous coated layer, conductivity and transparency.

In the present invention, the conductor thin film may be formed on the plastic base film by means of an anchor layer or a dielectric layer. The anchor layer or dielectric layer may enhance a cohesive property between the conductor thin film and the base film, and improve scratch resistance or elasticity. The anchor layer or dielectric layer may be formed of an inorganic material such as $SiO_2$, $MgF_2$ or $Al_2O_3$, an organic material such as an acryl resin, an urethane resin, a melamine resin, an alkyd resin or a siloxane-based polymer, or a mixture of at least two thereof by vacuum deposition, sputtering, ion plating or coating. The anchor layer or dielectric layer may be generally formed to have a thickness of approximately 100 nm or less, preferably, 15 to 100 nm, and more preferably 20 to 60 nm.

In the present invention, the base or substrate having the conductor thin film may be subjected to suitable adhering treatment such as corona discharging treatment, UV irradiation treatment, plasma treatment or sputter etching treatment.

The touch panel of the present invention includes the base and the pressure-sensitive adhesive layer attached to the conductor thin film formed on the base.

In the present invention, the pressure-sensitive adhesive layer includes an acryl polymer prepared by polymerizing isobornyl (meth)acrylate, preferably, 5 to 30 parts by weight of isobornyl acrylate, and methyl (meth)acrylate, preferably, 5 to 40 parts by weight of methyl acrylate.

In the present invention, the unit "parts by weight" means a weight ratio.

The acryl polymer may include 5 to 30 parts by weight, preferably, 10 to 30 parts by weight, of isobornyl (meth) acrylate as a polymerization unit. When the amount of isobornyl (meth)acrylate is excessively small, adhesive strength does not increase, and when the amount of isobornyl (meth)acrylate is excessively large, the convention ratio may decrease during polymerization, it may be difficult to raise molecular weight, and the acryl polymer may become too hard to ensure adhesive strength as a pressure-sensitive adhesive. The isobornyl (meth)acrylate may be isobornyl acrylate in terms of compatibility with a touch panel.

In addition, the acryl polymer may include 5 to 40 parts by weight, preferably, 10 to 30 parts by weight, of methyl (meth)acrylate as a polymerization unit. When the amount of methyl (meth)acrylate is excessively small, the convention ratio may decrease during polymerization and it may be difficult to raise molecular weight, and when the amount of methyl (meth)acrylate is excessively large, adhesive strength may decrease. The methyl (meth)acrylate may be methyl acrylate in terms of compatibility with a touch panel.

In addition, a pressure-sensitive adhesive containing isobornyl (meth)acrylate and methyl (meth)acrylate at the above-mentioned contents may not be easily peeled under severe conditions due to excellent compatibility with the conductor thin film, particularly, an ITO, and high adhesive strength, effectively inhibit bubble generation, even when a plastic film is used as a base of the pressure-sensitive adhesive, and effectively inhibit a change in the resistance of the conductor thin film to stably drive the touch panel even when the pressure-sensitive adhesive is directly attached to the ITO for a long time.

In the present invention, the acryl polymer may have a weight average molecular weight of 200,000 or more. The upper limit is not specifically limited, and may be 2,500,000 or less. When the weight average molecular weight of the polymer is excessively low, durability may be degraded, and therefore, the upper limit is preferably controlled within the above-mentioned range.

In the present invention, a polydispersity index is a value $(M_w/M_n)$ obtained by dividing the weight average molecular weight $(M_w)$ by the number average molecular weight $(M_n)$ of the polymer. The weight average molecular weight and the number average molecular weight may be measured by a known method such as gel permeation chromatography (GPC).

In the present invention, the acryl polymer may further include 30 to 80 parts by weight of monomer represented by Formula 1, and 0.01 to 20 parts by weight of copolymerizable monomer having a crosslinkable functional group as polymerization units.

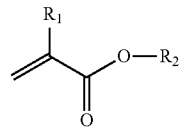

[Formula 1]

In Formula 1, $R_1$ is hydrogen or a methyl group, and $R_2$ is a linear or branched alkyl group having at least 2 carbon atoms, preferably, a linear or branched alkyl group having 2 to 20 carbon atoms, and more preferably, a linear or branched alkyl group having 2 to 10 carbon atoms.

The kind of monomer having a linear or branched alkyl group having at least 2 carbon atoms is not specifically limited, and may be alkyl (meth)acrylate having an alkyl group having 2 to 14 carbon atoms in consideration of physical properties such as cohesive strength, glass transition temperature, and a pressure-sensitive adhesive property.

Examples of the alkyl (meth)acrylate may include ethyl (meth)acrylate, n-propyl (meth)acrylate, isopropyl (meth) acrylate, butyl (meth)acrylate, t-butyl (meth)acrylate, pentyl (meth)acrylate, 2-ethylhexyl (meth)acrylate, n-octyl (meth) acrylate, isooctyl (meth)acrylate, isononyl (meth)acrylate, lauryl (meth)acrylate and tetradecyl (meth)acrylate, and may be included in a polymerized form of one or at least two thereof.

The copolymerizable monomer having a crosslinkable functional group may provide a crosslinkable functional group that may be reacted with a multifunctional crosslinking agent to the acryl polymer. Examples of the crosslinkable functional group may include a hydroxyl group, a carboxyl group, a nitrogen-containing group, an epoxy group or an isocyanate group, and preferably a hydroxyl group, a carboxyl group or a nitrogen-containing group. In the field of preparing an acryl polymer, various copolymerizable monomers capable of providing the crosslinkable functional group to an acryl polymer are known, and the monomer described above may be used without limitation. For example, a copolymerizable monomer having a hydroxyl group may be 2-hydroxyethyl (meth)acrylate, 2-hydroxypropyl (meth)acrylate, 4-hydroxybutyl (meth) acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, a copolymerizable monomer having a carboxyl group may be (meth) acrylic acid, 2-(meth)acryloyloxy acetic acid, 3-(meth)acryloyloxy propylic acid, 4-(meth)acryloyloxy butyric acid, acrylic acid dimer, itaconic acid, maleic acid or maleic anhydride, and a copolymerizable monomer having a nitrogen-containing group may be (meth)acrylamide, N-vinyl pyrrolidone or N-vinyl caprolactam, but the present invention is not limited thereto.

In the present invention, the acryl polymer may be prepared by a conventional polymerization method in the art, such as solution polymerization, photo polymerization, bulk polymerization, suspension polymerization or emulsion polymerization, and preferably solution polymerization.

In addition, in the present invention, a conversion rate of the acryl polymer may be 90% or more. When the conversion rate of the acryl polymer is less than 90%, some of the monomer component remains in an unreacted state, which is ineffective. That is, since the amount of unused monomer input increases, economic feasibility decreases, and it is difficult to volatilize all the monomer to remove during a coating and drying process.

In the present invention, the pressure-sensitive adhesive layer may further include a thiol compound by adding the thiol compound in coating a blend of the acryl polymer and an additive such as a curing agent after the completion of polymerization. The thiol compound may effectively inhibit the increase in resistance value of the conductor thin film by forming a permanent protective layer through a reaction with the conductor thin film.

In addition, the pressure-sensitive adhesive layer may include a thiol polymer derived from an acryl monomer and a thiol compound, in addition to the acryl polymer, by adding a thiol compound together with the input of an initiator before the polymerization reaction of the acryl polymer or during the polymerization reaction.

As the thiol polymer is formed by inputting the thiol compound after the polymerization reaction of the (meth) acrylic acid ester monomer is initiated before the polymerization reaction is terminated, the thiol compound is reacted with a remaining monomer to form a thiol polymer having a low molecular weight.

Therefore, when the thiol polymer is attached to the conductor thin film, alteration of the conductor thin film may be prevented and the change in the resistance of the conductor thin film may be effectively inhibited.

The thiol compound may be at least one of the compounds represented by Formulas 2 to 5, but the present invention is not limited thereto.

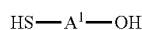

[Formula 2]

[Formula 3]

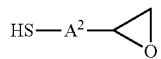

[Formula 4]

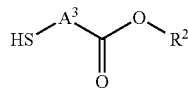

[Formula 5]

In Formulas 2 to 5, $A^1$ to $A^3$ are independently linear or branched alkylene, $R^1$ is linear or branched alkyl, and $R^2$ is hydrogen, an alkyl group or $-A^4-C(-A^5-O-C(=O)-A^6-SH)_nR_{(3-n)}$. $A^4$ to $A^6$ are independently linear or branched alkylene, R is linear or branched alkyl, and n is an integer between 1 and 3.

In the thiol compounds of Formulas 2 to 5, $A^1$ is preferably linear or branched alkylene having 1 to 8 carbon atoms.

In the thiol compounds of Formulas 2 to 5, $R^1$ is preferably a linear or branched alkyl group having 3 to 20 carbon atoms.

In the thiol compounds of Formulas 2 to 5, $A^2$ is preferably linear or branched alkylene having 1 to 4 carbon atoms.

In the thiol compounds of Formulas 2 to 5, $A^3$ is preferably linear or branched alkylene having 1 to 4 carbon atoms, and $R^2$ is hydrogen, a linear or branched alkyl group having 4 to 12 carbon atoms or $-A^4-C(-A^5-O-C(=O)-A^6-SH)_nR_{(3-n)}$. Here, preferably, $A^4$ to $A^6$ are independently linear or branched alkylene having 1 to 4 carbon atoms, and n is preferably 2 or 3. Particularly, the alkyl or alkylene may be substituted with a substituent conventionally used in the art, and a suitable substituent may be a thiol, hydroxyl, or carboxyl group, and preferably a thiol group.

The thiol compound is the most preferably at least one selected from the group consisting of 2-mercaptoethanol, glycidyl mercaptan, mercaptoacetic acid, 2-ethylhexylthioglycolate, 2,3-dimermercapto-1-propanol, n-dodecanthiol, t-butyl mercaptan, n-butyl mercaptan, 1-octadecanthiol, trimethylol propane tris(3-mercaptothiol) and pentaerythritol tetrakis(3-mercaptopropionate).

The thiol polymer may be formed by inputting 0.001 to 5 parts by weight, preferably 0.01 to 4 parts by weight of a thiol compound with respect to 100 parts by weight of (meth)acrylic acid ester monomer after the polymerization reaction of the (meth)acrylic acid ester monomer is initiated before the polymerization reaction is terminated, thereby enhancing performance of inhibiting a change in the resistance of a conductor thin film.

Meanwhile, in the present invention, when a cured product of a composition applied to the pressure-sensitive adhesive layer is composed of a thermosetting composition, the pressure-sensitive adhesive layer or composition may further include a multifunctional crosslinking agent together with the acryl polymer and the thiol compound, which are described above. Such a crosslinking agent acts to improve cohesive strength of a resin cured product (pressure-sensitive adhesive) through a reaction with a polar functional group included in the acryl-based polymer, provide a crosslinking structure, and control a pressure-sensitive adhesive characteristic.

The kind of crosslinking agent that can be used in the present invention is not particularly limited, and may be an isocyanate compound, an epoxy compound, an aziridine compound, or a metal chelating compound, and one or at least two crosslinking agent may be suitably selected in consideration of the kind of crosslinkable functional group included in a resin. The isocyanate compound may be tolylene diisocyanate, xylene diisocyanate, diphenylmethane diisocyanate, hexamethylene diisocyanate, isoboron diisocyanate (isophorone diisocyanate), tetramethylxylene diisocyanate, naphthalene diisocyanate, or an addition-reaction product of at least one isocyanate compound thereof and a polyol. Here, the polyol may be trimethylolpropane. In addition, the epoxy compound may be one or at least two of ethyleneglycol diglycidylether, triglycidylether, trimethylolpropane triglycidylether, N,N,N',N'-tetraglycidyl ethylenediamine and glycerin diglycidylether, and the aziridine compound may be one or at least two of N,N'-toluene-2,4-bis (1-aziridine carboxamide), N,N'-diphenylmethane-4,4'-bis (1-aziridine carboxamide), triethylenemelamine, bisisoprothaloyl-1-(2-methylaziridine) and tri-1-aziridinyl phosphine oxide. Moreover, the metal chelate compound may be a compound in which a polyvalent metal is coordinated to acetyl acetone or ethyl acetoacetate, and the polyvalent metal may be aluminum, iron, zinc, tin, titanium, antimony, magnesium or vanadium.

In the pressure-sensitive adhesive layer of the present invention, the multifunctional crosslinking agent may include 0.01 to 5 parts by weight with respect to 100 parts by weight of an acryl-based resin, and within this range, durability and an adhesive property of the pressure-sensitive adhesive layer may be effectively controlled.

The pressure-sensitive adhesive layer of the present invention may further include one or at least two of a silane coupling agent, a tackifier, an epoxy resin, a UV stabilizer, an antioxidant, a coloring agent, a reinforcing agent, a filler, a foaming agent, a surfactant and a plasticizer, in addition to the above-described components.

In the present invention, the pressure-sensitive adhesive layer may have a peel strength with respect to a polycarbonate sheet of 1,900 g/25 mm or more, preferably, 2,500 g/25 mm or more, and more preferably, 2,700 g/25 mm or more. When the peel strength is very low, durability and an effect of inhibiting bubble generation are degraded, and lift-off and peeling easily occur. The upper limit of the peel strength is not specifically limited.

In the present invention, the pressure-sensitive adhesive layer may have a resistance change ratio of ITO of 10% or less, preferably 7% or less, and more preferably 6% or less. When the resistance change ratio is higher than 10%, driving stability of the touch panel is degraded.

The resistance change ratio ($\Delta R$) may be expressed as Expression 1.

$$\Delta R = [(R-R_i)/R_i] \times 100 \qquad \text{[Expression 1]}$$

In Formula 1, $\Delta R$ is a resistance change ratio, $R_i$ is an initial resistance of an ITO electrode measured after the pressure-sensitive adhesive layer is attached to the ITO electrode, and R is the resistance of the ITO electrode measured after the ITO electrode to which the pressure-sensitive adhesive layer is attached is maintained at 60° C. and a relative humidity of 90% for 240 hours. In the present invention, a specific method of measuring the resistance change ratio employs a method as will be described in the following exemplary embodiment. In addition, as the resistance change ratio decreases, the touch panel is more stably driven, and thus the lower limit of the resistance change ratio is not limited.

In another aspect, a pressure-sensitive adhesive composition for a touch panel may include an acryl polymer containing 5 to 30 parts by weight of isobornyl (meth)acrylate, and 5 to 40 parts by weight of methyl (meth)acrylate as polymerization units.

The polymerization unit means a basic structure unit forming a polymer in manufacturing a polymer.

The pressure-sensitive adhesive composition for a touch panel of the present invention may be applied to a touch panel having the above-described structure. Specifically, the composition may be applied to the pressure-sensitive adhesive layer of a touch panel including a base and a pressure-sensitive adhesive layer attached to the base.

In still another aspect, a double-sided pressure-sensitive tape for a touch panel may include a pressure-sensitive adhesive layer formed of a pressure-sensitive adhesive composition containing an acryl polymer containing 5 to 30 parts by weight of isobornyl (meth)acrylate, and 5 to 40 parts by weight of methyl (meth)acrylate.

FIG. 4 is a double-sided pressure-sensitive adhesive tape according to one exemplary embodiment of the present invention, the tape further including the pressure-sensitive adhesive layer 41, and releasing films 42 and 43 formed on both surfaces of the pressure-sensitive adhesive layer 41.

When the double-sided pressure-sensitive adhesive tape includes the releasing film, peel strengths of a pressure-sensitive adhesive layer with respect to two sheets of the releasing films may be different from each other. For example, in the structure shown in FIG. 4, peel strength of the pressure-sensitive adhesive layer 41 with respect to one releasing film 43 may be higher than the peel strength of pressure-sensitive adhesive layer 41 with respect to the other releasing film 42. The double-sided pressure-sensitive adhesive tape having such a structure may be formed by suitably selecting the kind of releasing film, or controlling a cure degree of the pressure-sensitive adhesive layer 41.

The kind of releasing film of the present invention is not specifically limited, and thus various releasing films known in the art may be used without limitation, and the thickness of the releasing film may be controlled to approximately 5 to 150 μm.

In yet another aspect, a method of preparing a pressure-sensitive adhesive composition of the present invention may include preparing a monomer mixture containing an acryl polymer containing 5 to 30 parts by weight of isobornyl (meth)acrylate, and 5 to 40 parts by weight of methyl (meth)acrylate, and inputting an initiator to initiate polymerization of the monomer mixture. Details relating to the monomer are described above. In addition, the present invention is not limited to the kind and content of an initiator, and, for example, 0.01 to 1 part by weight of azobisisobutyronitrile (AIBN) may be used as an initiator.

In addition, an operation of adding a thiol compound together with an initiator, after the initiation of the polymerization before the termination thereof, after the termination of the polymerization, may be further included. Details relating to the thiol compound are described above.

In addition, an acryl adhesive composition may be prepared by further blending a crosslinking agent and another additive. Details relating to the crosslinking agent and the additive are described above.

In the present invention, the method of forming a pressure-sensitive adhesive layer and manufacturing a double-sided pressure-sensitive adhesive tape as described above is not specifically limited. For example, a double-sided pressure-sensitive adhesive tape may be manufactured by coating a pressure-sensitive adhesive composition of the present invention or a coating solution whose viscosity is controlled by diluting the composition with a suitable solvent on a releasing film, forming a pressure-sensitive adhesive layer by curing the coated product, and laminating another releasing film. In addition, the coating may not be necessarily executed on the releasing film, or may be executed on a suitable base for a different process. In addition, the curing process of the coated coating solution may be executed by drying the coating layer under suitable conditions, and when necessary, a process of crosslinking an acryl-based resin included in the pressure-sensitive adhesive composition by heating after or together with the drying process using a multifunctional crosslinking agent may be executed. However, the crosslinking process is not necessarily performed in the process of forming the pressure-sensitive adhesive layer, or may be performed when the double-sided pressure-sensitive adhesive tape is applied to a touch panel.

For example, when the double-sided pressure-sensitive adhesive tape is applied to a touch panel having the structure described above, the pressure-sensitive adhesive layer may be coated on a base or a conductor thin film formed on the base, and the acryl-based resin may be crosslinked through suitable crosslinking treatment.

BRIEF DESCRIPTION OF THE DRAWINGS

The above and other objects, features and advantages of the present invention will become more apparent to those of ordinary skill in the art by describing in detail exemplary embodiments thereof with reference to the adhered drawings, in which.

Figure 1:
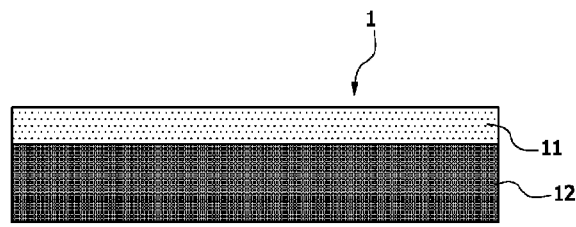
FIGS. 1 to 3 show a structure of a touch panel according to one exemplary embodiment of the present invention.
Figure 2:
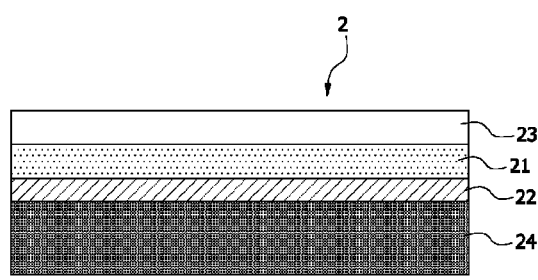
Figure 3:
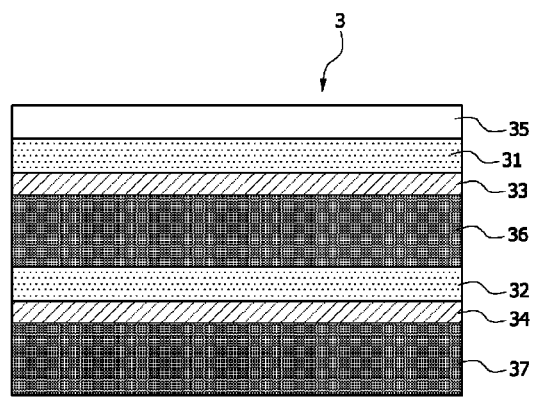

1, 2, 3: basic structure of the touch panel
11, 21, 31, 32, 41: pressure sensitive adhesive layer
23, 35: substrate 22, 33, 34: conductor thin film
12, 24, 36, 37: base
4: double-sided pressure-sensitive adhesive tape
42, 43: releasing film
10: PET film
20: ITO thin film
30: silver paste
40: pressure sensitive adhesive layer
51: releasing film
60: resistance measurer

DETAILED DESCRIPTION OF EXEMPLARY EMBODIMENTS

Hereinafter, the present invention will be described in detail with reference to Examples according to the present invention and Comparative Examples not according to the present invention, but the scope of the present invention is not limited to the following examples.

Physical properties in Examples were evaluated by the following methods:

1. Durability Test

A sample was prepared by attaching a hard coating surface of a polyethyleneterephthalate (PET) film (thickness: 100 μm) having hard coatings formed on both surfaces to a polycarbonate sheet (thickness: 1 mm) by means of a pressure-sensitive adhesive layer, cutting the resulting product to a size of 50 mm (width)×100 mm (length), and putting the cut product in an autoclave at 60° C. under 5 atm for 30 minutes. Afterward, the sample was left at 80° C. for 240 hours, and then durability was evaluated.

The durability was evaluated by observing whether or not bubbles were generated and lift-off/peeling occurred when the sample was left under the above conditions, and specific measuring methods and criteria for evaluating respective properties are as follows:

<Criteria for Evaluating Bubble Generation>

O: When bubbles were not observed or it was observed that a small amount of bubbles having a diameter of 100 μm or less were dispersed at a pressure-sensitive adhesive interface through observation using an optical microscope X: When bubbles having a diameter of 100 μm or more, or groups of bubbles having a diameter of 100 μm or less were observed at a pressure-sensitive adhesive interface through observation using an optical microscope <Criteria for Evaluating Lift-Off/Peeling>

Figure 4:
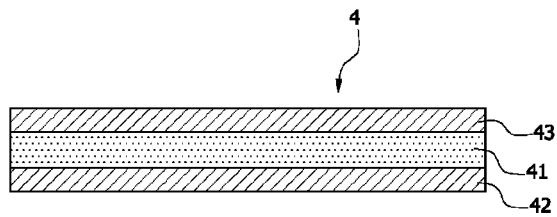
FIG. 4 shows a double-sided pressure-sensitive adhesive tape according to an exemplary embodiment of the present invention.
Figure 5:
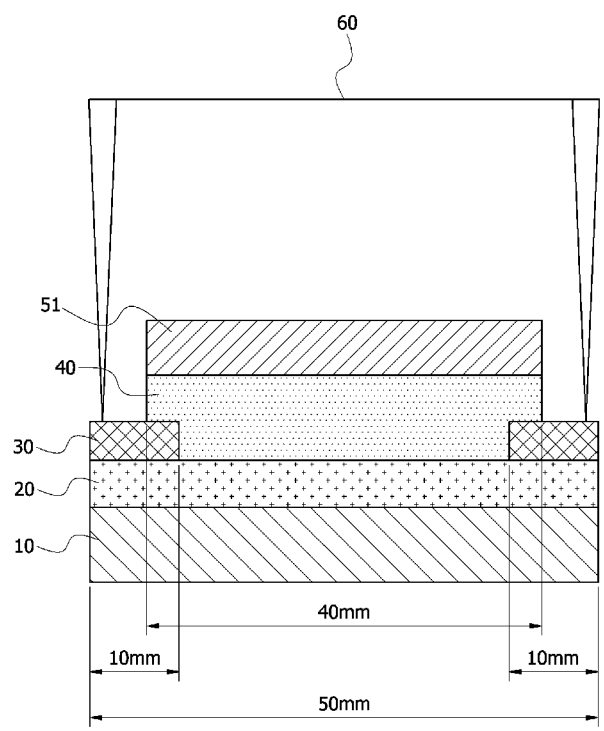
FIG. 5 illustrates a method of measuring a resistance change ratio according to the present invention.

O: When there was no lift-off/peeling at a pressure-sensitive adhesive interface X: When lift-off/peeling occurred at a pressure-sensitive adhesive interface 2. Resistance Change Ratio Test A resistance change ratio was measured by the method shown in FIG. 5. First, a PET film 10 (hereinafter, referred to as a "conductive PET" which is commercially available) having an ITO thin film 20 formed on one surface thereof, was cut into a size of 30 mm×50 mm (width×length). Subsequently, as shown in FIG. 5, a silver paste 30 was applied to both ends of the film to a width of 10 mm, and plasticized at 150° C. for 30 minutes. Afterward, a pressure-sensitive adhesive film having releasing films 51 attached to both surfaces thereof, as manufactured in Examples, was cut into a size of 30 mm×40 mm (width×length), the releasing film was removed from one surface of the pressure-sensitive adhesive film, and then a pressure-sensitive adhesive layer 40 was attached to the plasticized film by matching a center of the pressure-sensitive adhesive layer 40 with centers of the conductive PET 10. Then, an initial resistance $R_i$ was measured using a conventional resistance measurer 60. After measuring the initial resistance, a sample having the structure shown in FIG. 4 was left at 60° C. and 90% relative humidity for 240 hours, and a resistance (R) was measured using the measurer 60. Each value was put into Equation 1 to measure a resistance change ratio (P).

$$P=[(R-R_i)/R_i]\times 100 \quad [\text{Equation 1}]$$

3. Peel Strength Test

Peel strength was measured by preparing a double-sided pressure-sensitive adhesive tape previously manufactured to have a width of 1 inch and attaching the tape on a polycarbonate-stacked structure as an adherent by rolling the tape twice using a 2-kg roller. 30 minutes after the attachment, a 180-degree peel strength (peel rate: 300 mm/min) was measured at room temperature using a texture analyzer. The measurement was performed three times per each sample, and an average value was listed in Table 2.

4. Evaluation of Weight Average Molecular Weight and Polydispersity Index

Weight average molecular weight and a polydispersity index of an acryl polymer were measured using GPC under the following conditions. To prepare a calibration curve, measurement results were converted using standard polystyrene produced by Agilent System.

<Conditions for Measuring Weight Average Molecular Weight>

Measurer: Agilent GPC (Agilent 1200 series, USA)
Column. Two PL Mixed Bs connected
Column Temperature: 40° C.
Eluent: Tetrahydrofuran
Flow Rate: 1.0 mL/min
Concentration: Up to Approximately 2 mg/mL (100 μL injection)

5. Measurement of Conversion Rate

A conversion rate in the present invention means a ratio of a solid content finally measured to a content of a monomer initially input, and is represented by the following Equation:

Conversion rate (%)=(Weight of Solid Content)/ (Weight of Monomer Initially Input)

Here, the solid content was obtained by drying a solution containing an acryl polymer at 150° C. for 30 minutes after polymerization of monomers, and the weight thereof was measured, thereby calculating a conversion rate.

Preparation of Acryl Polymers

Preparation Example 1

Preparation of Acryl Polymer A 58 parts by weight of n-butyl acrylate (n-BA), 20 parts by weight of isobornylacrylate (IBOA), 20 parts by weight of methyl acrylate (MA) and 2 parts by weight of hydroxyethyl acrylate (HEA) were put into a 1 L reactor in which a cooling apparatus was equipped to reflux a nitrogen gas and facilitate temperature control. Subsequently, 150 parts by weight of ethylacetate (EAc) was added as a solvent, and 0.03 parts by weight of n-dodecanthiol was input as a thiol compound. The reactor was purged with nitrogen gas for 60 minutes to remove oxygen, temperature increased and was maintained at 60° C., and 0.04 parts by weight of azobisisobutyronitrile (AIBN) was input as a reaction initiator to execute the reaction for 5 hours. After the reaction, a reaction product was diluted with EAc, thereby obtaining an acryl polymer A having a solid content of 30 wt %, a weight average molecular weight of 800,000, and a polydispersity index ($M_w/M_n$) of 3.2.

Preparation Example 2

Preparation of Acryl Polymer B

An acryl polymer B having a solid content of 30 wt %, a weight average molecular weight of 820,000 and a polydispersity index of 3.1 was prepared by the same method as described in Preparation Example 1, except that 63 parts by weight of n-BA and 15 parts by weight of MA, instead of 58 parts by weight of n-BA and 20 parts by weight of MA, were used.

Preparation Example 3

Preparation of Acryl Polymer C

An acryl polymer C having a solid content of 30 wt %, a weight average molecular weight of 780,000 and a polydispersity index of 3.4 was prepared by the same method as described in Preparation Example 1, except that 58 parts by weight of 2-EHA, instead of 58 parts by weight of n-BA, was used.

Preparation Example 4

Preparation of Acryl Polymer D

An acryl polymer D having a solid content of 30 wt %, a weight average molecular weight of 830,000 and a polydispersity index of 3.2 was prepared by the same method as described in Preparation Example 1, except that 63 parts by weight of 2-EHA and 15 parts by weight of MA, instead of 58 parts by weight of n-BA and 20 parts by weight of MA, were used.

Preparation Example 5

Preparation of Acryl Polymer E

An acryl polymer E having a solid content of 30 wt %, a weight average molecular weight of 850,000 and a polydispersity index of 3.0 was prepared by the same method as described in Preparation Example 1, except that 5 parts by weight of isobornyl acrylate (IBOA) and 35 parts by weight of MA, instead of 20 parts by weight of IBOA and 20 parts by weight of MA, were used.

Preparation Example 6

Preparation of Acryl Polymer F

An acryl polymer F having a solid content of 30 wt %, a weight average molecular weight of 750,000 and a polydispersity index of 3.2 was prepared by the same method as described in Preparation Example 1, except that 65 parts by weight of n-BA, 28 parts by weight of IBOA and 5 parts by weight of MA, instead of 58 parts by weight of nBA, 20 parts by weight of IBOA and 20 parts by weight of MA, were used.

Preparation Example 7

Preparation of Acryl Polymer G

An acryl polymer G having a solid content of 30 wt %, a weight average molecular weight of 800,000 and a polydispersity index of 3.2 was prepared by the same method as described in Preparation Example 1, except that 63 parts by weight of n-BA, 25 parts by weight of IBOA and 10 parts by weight of MA, instead of 58 parts by weight of n-BA, 20 parts by weight of IBOA and 20 parts by weight of MA, were used.

Preparation Example 8

Preparation of Acryl Polymer H

An acryl polymer H having a solid content of 30 wt %, a weight average molecular weight of 420,000 and a polydispersity index of 3.6 was prepared by the same method as described in Preparation Example 1, except that 73 parts by weight of n-BA, 25 parts by weight of IBOA and 2 parts by weight of hydroxyethyl acrylate (HEA), instead of 58 parts by weight of n-BA, 20 parts by weight of IBOA and 2 parts by weight of HEA, were used.

Preparation Example 9

Preparation of Acryl Polymer I

An acryl polymer I having a solid content of 30 wt %, a weight average molecular weight of 850,000 and a polydispersity index of 2.9 was prepared by the same method as described in Preparation Example 1, except that 58 parts by weight of n-BA, 40 parts by weight of MA and 2 parts by weight of HEA, instead of 58 parts by weight of n-BA, 20 parts by weight of IBOA, 20 parts by weight of MA and 2 parts by weight of HEA, were used.

Preparation Example 10

Preparation of Acryl Polymer J

An acryl polymer J having a solid content of 30 wt %, a weight average molecular weight of 360,000 and a polydispersity index of 3.4 was prepared by the same method as described in Preparation Example 1, except that 73 parts by weight of 2-EHA, 25 parts by weight of IBOA and 2 parts by weight of HEA, instead of 58 parts by weight of n-BA, 20 parts by weight of IBOA, 20 parts by weight of MA and 2 parts by weight of HEA, were used.

Preparation Example 11

Preparation of Acryl Polymer K

An acryl polymer K having a solid content of 30 wt %, a weight average molecular weight of 760,000 and a polydispersity index of 2.9 was prepared by the same method as described in Preparation Example 1, except that 58 parts by weight of 2-EHA, 40 parts by weight of MA and 2 parts by weight of HEA, instead of 58 parts by weight of n-BA, 20 parts by weight of IBOA, 20 parts by weight of MA and 2 parts by weight of HEA, were used.

Preparation Example 12

Preparation of Acryl Polymer L

An acryl polymer L having a solid content of 30 wt %, a weight average molecular weight of 700,000 and a polydispersity index of 2.9 was prepared by the same method as described in Preparation Example 1, except that 74 parts by weight of n-BA, 4 parts by weight of IBOA, 20 parts by weight of MA and 2 parts by weight of HEA, instead of 58 parts by weight of n-BA, 20 parts by weight of IBOA, 20 parts by weight of MA and 2 parts by weight of HEA, were used.

Preparation Example 13

Preparation of Acryl Polymer M

An acryl polymer M having a solid content of 30 wt %, a weight average molecular weight of 680,000 and a polydispersity index of 3.1 was prepared by the same method as described in Preparation Example 1, except that 46 parts by weight of n-BA, 32 parts by weight of IBOA, 20 parts by weight of MA and 2 parts by weight of HEA, instead of 58 parts by weight of n-BA, 20 parts by weight of IBOA, 20 parts by weight of MA and 2 parts by weight of HEA, were used.

Preparation Example 14

Preparation of Acryl Polymer N

An acryl polymer N having a solid content of 30 wt %, a weight average molecular weight of 500,000 and a polydispersity index of 3.4 was prepared by the same method as described in Preparation Example 1, except that 74 parts by weight of n-BA, 20 parts by weight of IBOA, 4 parts by weight of MA and 2 parts by weight of HEA, instead of 58 parts by weight of n-BA, 20 parts by weight of IBOA, 20 parts by weight of MA and 2 parts by weight of HEA, were used.

Preparation Example 15

Preparation of Acryl Polymer O

An acryl polymer O having a solid content of 30 wt %, a weight average molecular weight of 800,000 and a polydispersity index of 2.9 was prepared by the same method as described in Preparation Example 1, except that 35 parts by weight of n-BA, 20 parts by weight of IBOA, 43 parts by weight of MA and 2 parts by weight of HEA, instead of 58 parts by weight of n-BA, 20 parts by weight of IBOA, 20 parts by weight of MA and 2 parts by weight of HEA, were used.

Preparation Example 16

Preparation of Acryl Polymer P

An acryl polymer P having a solid content of 30 wt %, a weight average molecular weight of 900,000 and a polydispersity index of 4.5 was prepared by the same method as described in Preparation Example 1, except that a thiol polymer is not input.

Manufacture of Double-Sided Pressure-Sensitive Adhesive Tape

Example 1

The acryl polymer obtained in Preparation Example 1 was used as a pressure-sensitive adhesive resin, and a pressure-sensitive adhesive solution was prepared by uniformly mixing 0.3 parts by weight of an isocyanate crosslinking agent (toluene diisocyanate (TDI); solid) with respect to 100 parts by weight of the pressure-sensitive adhesive resin (solid).

A transparent pressure-sensitive adhesive layer having a coating thickness of 50 μm was formed by coating the pressure-sensitive adhesive solution on a releasing-treated surface of a PET film (thickness: 50 μm) and leaving the coated product at 120° C. for 3 minutes. Subsequently, a double-sided pressure-sensitive adhesive tape having the structure shown in FIG. 4 was manufactured by laminating a releasing-treated surface of the PET film (thickness: 50 μm) to the other surface of the pressure-sensitive adhesive layer.

Example 2

A double-sided pressure-sensitive adhesive tape was prepared by the same method as described in Example 1, except that the acryl polymer B in Preparation Example 2 was used.

Example 3

A double-sided pressure-sensitive adhesive tape was prepared by the same method as described in Example 1, except that the acryl polymer C in Preparation Example 3 was used.

Example 4

A double-sided pressure-sensitive adhesive tape was prepared by the same method as described in Example 1, except that the acryl polymer D in Preparation Example 4 was used.

Example 5

A double-sided pressure-sensitive adhesive tape was prepared by the same method as described in Example 1, except that the acryl polymer E in Preparation Example 5 was used.

Example 6

A double-sided pressure-sensitive adhesive tape was prepared by the same method as described in Example 1, except that the acryl polymer F in Preparation Example 6 was used.

Example 7

A double-sided pressure-sensitive adhesive tape was prepared by the same method as described in Example 1, except that the acryl polymer G in Preparation Example 7 was used.

Comparative Example 1

A double-sided pressure-sensitive adhesive tape was prepared by the same method as described in Example 1, except that the acryl polymer H in Preparation Example 8 was used.

Comparative Example 2

A double-sided pressure-sensitive adhesive tape was prepared by the same method as described in Example 1, except that the acryl polymer I in Preparation Example 9 was used.

Comparative Example 3

A double-sided pressure-sensitive adhesive tape was prepared by the same method as described in Example 1, except that the acryl polymer J in Preparation Example 10 was used.

Comparative Example 4

A double-sided pressure-sensitive adhesive tape was prepared by the same method as described in Example 1, except that the acryl polymer K in Preparation Example 11 was used.

Comparative Example 5

A double-sided pressure-sensitive adhesive tape was prepared by the same method as described in Example 1, except that the acryl polymer L in Preparation Example 12 was used.

Comparative Example 6

A double-sided pressure-sensitive adhesive tape was prepared by the same method as described in Example 1, except that the acryl polymer M in Preparation Example 13 was used.

Comparative Example 7

A double-sided pressure-sensitive adhesive tape was prepared by the same method as described in Example 1, except that the acryl polymer N in Preparation Example 14 was used.

Comparative Example 8

A double-sided pressure-sensitive adhesive tape was prepared by the same method as described in Example 1, except that the acryl polymer O in Preparation Example 15 was used.

Comparative Example 9

A double-sided pressure-sensitive adhesive tape was prepared by the same method as described in Example 1, except that the acryl polymer P in Preparation Example 16 was used.

Compositions in Examples and Comparative Examples are shown in Table 1.

TABLE 1

| | | Acryl Polymer (Parts by Weight) | | | | | Initiator AIBN (Parts by Weight) | Thiol Compound n-dodecanthiol (Parts by Weight) | Crosslinking Agent TDI (Parts by Weight) |
|---|---|---|---|---|---|---|---|---|---|
| | | BA | EHA | IBOA | MA | HEA | | | |
| Example | 1 | 58 | — | 20 | 20 | 2 | 0.04 | 0.03 | 0.3 |
| | 2 | 63 | — | 20 | 15 | 2 | 0.04 | 0.03 | 0.3 |
| | 3 | — | 58 | 20 | 20 | 2 | 0.04 | 0.03 | 0.3 |
| | 4 | — | 63 | 20 | 15 | 2 | 0.04 | 0.03 | 0.3 |
| | 5 | 58 | — | 5 | 35 | 2 | 0.04 | 0.03 | 0.3 |
| | 6 | 65 | — | 28 | 5 | 2 | 0.04 | 0.03 | 0.3 |
| | 7 | 63 | — | 25 | 10 | 2 | 0.04 | 0.03 | 0.3 |
| Comparative Example | 1 | 73 | — | 25 | — | 2 | 0.04 | 0.03 | 0.3 |
| | 2 | 58 | — | — | 40 | 2 | 0.04 | 0.03 | 0.3 |
| | 3 | — | 73 | 25 | — | 2 | 0.04 | 0.03 | 0.3 |
| | 4 | — | 58 | — | 40 | 2 | 0.04 | 0.03 | 0.3 |
| | 5 | 74 | — | 4 | 20 | 2 | 0.04 | 0.03 | 0.3 |
| | 6 | 46 | — | 32 | 20 | 2 | 0.04 | 0.03 | 0.3 |
| | 7 | 74 | — | 20 | 4 | 2 | 0.04 | 0.03 | 0.3 |
| | 8 | 35 | — | 20 | 43 | 2 | 0.04 | 0.03 | 0.3 |
| | 9 | 58 | — | 20 | 20 | 2 | 0.04 | 0 | 0.3 |

BA: n-butyl acrylate
EHA: 2-ethylhexyl acrylate
IBOA: isobornyl acrylate
MA: methyl acrylate
HEA: hydroxyethyl acrylate
AIBN: azobisisobutyronitrile
TDI: toluene diisocyanate Conversion rates, weight average molecular weights, polydispersity indexes, and results of the durability and resistance change ratio tests, which were measured in Examples and Comparative Examples, are shown in Table 2.

TABLE 2

| | | Acryl Polymer | | | Inhibition of Bubble Generation | Evaluation of Lift-off/Peeling | Peel Strength (g/25 mm) Adherent PC Sheet | Resistance Change Ratio (%) |
|---|---|---|---|---|---|---|---|---|
| | | Conversion Rate | $M_w$ (10,000) | Polydiversity Index | | | | |
| Example | 1 | 95% | 80 | 3.2 | ○ | ○ | 2860 | 5 |
| | 2 | 95% | 82 | 3.1 | ○ | ○ | 2820 | 5 |
| | 3 | 95% | 78 | 3.4 | ○ | ○ | 2700 | 6 |
| | 4 | 95% | 83 | 3.2 | ○ | ○ | 2740 | 6 |

TABLE 2-continued

|  |  | Acryl Polymer | | | Inhibition | Evaluation | Peel Strength (g/25 mm) | Resistance |
|---|---|---|---|---|---|---|---|---|
|  |  | Conversion Rate | $M_w$ (10,000) | Polydiversity Index | of Bubble Generation | of Lift-off/Peeling | Adherent PC Sheet | Change Ratio (%) |
|  | 5 | 95% | 85 | 3.0 | ○ | ○ | 2710 | 6 |
|  | 6 | 92% | 75 | 3.2 | ○ | ○ | 2720 | 6 |
|  | 7 | 92% | 80 | 3.2 | ○ | ○ | 2760 | 6 |
| Comparative Example | 1 | 80% | 42 | 3.6 | X | ○ | 2030 | 7 |
|  | 2 | 95% | 85 | 2.9 | ○ | ○ | 1820 | 5 |
|  | 3 | 83% | 36 | 3.4 | X | ○ | 2200 | 7 |
|  | 4 | 95% | 76 | 2.9 | ○ | ○ | 1750 | 5 |
|  | 5 | 90% | 70 | 2.9 | X | X | 1900 | 7 |
|  | 6 | 83% | 68 | 3.1 | X | X | 350 | 7 |
|  | 7 | 80% | 50 | 3.4 | X | X | 2100 | 7 |
|  | 8 | 95% | 80 | 2.9 | X | X | 150 | 6 |
|  | 9 | 90% | 90 | 4.5 | ○ | ○ | 2880 | 15 |

$M_w$: weight average molecular weight

As shown in Table 2, the pressure-sensitive adhesive layer of the present invention satisfies all of various properties required for a touch panel, and particularly, the pressure-sensitive adhesive having an excellent resistance change ratio with respect to ITO and a double-sided pressure-sensitive adhesive tape using the same can be manufactured.

The present invention provides a pressure-sensitive adhesive effectively inhibiting bubble generation and having high peel strength under severe conditions. When a pressure-sensitive adhesive layer is directly attached to a conductor thin film, a change in the resistance of the conductor thin film can be effectively inhibited, and thus a touch panel can be stably driven for a long time.

What is claimed is:

1. A touch panel, comprising:
   a base including an indium tin oxide (ITO) film formed on at least one surface thereof; and
   a pressure-sensitive adhesive layer directly attached to the ITO film on the base, which comprises an acryl polymer containing 5 to 28 parts by weight of isobornyl acrylate monomer and 5 to 35 parts by weight of methyl acrylate monomer in a polymerized form wherein the acryl polymer has a weight average molecular weight of 750,000 to 2,500,000,
   wherein the pressure-sensitive adhesive layer has a peel strength with respect to a polycarbonate sheet of 2,500 g/25 mm or more at a peel angle of 180 degrees, a peel rate of 300 mm/min and at room temperature, and a resistance change ratio of the indium tin oxide (ITO) film of 6% or less,
   wherein the pressure-sensitive adhesive layer completely covers the ITO film,
   wherein the pressure-sensitive adhesive layer comprises a thiol compound or a thiol polymer derived from an acryl monomer and a thiol compound, and,
   wherein the thiol compound is at least one of compounds represented by Formulas 2 to 5:

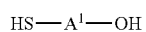  [Formula 2]

  [Formula 3]

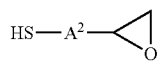  [Formula 4]

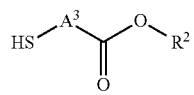  [Formula 5]

where $A^1$ to $A^3$ are independently linear or branched alkylene, $R^1$ is linear or branched alkyl, $R^2$ is hydrogen, an alkyl group or $-A^4-C(-A^5-O-C(=O)-A^6-SH)_n R_{(3-n)}$, $A^4$ to $A^6$ are independently linear or branched alkylene, R is linear or branched alkyl, and n is an integer between 1 and 3.

2. The touch panel according to claim 1, wherein the acryl polymer further comprises 30 to 80 parts by weight of a monomer represented by Formula 1, and 0.01 to 20 parts by weight of a copolymerizable monomer having a crosslinkable functional group:

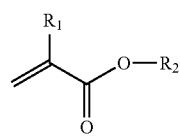  [Formula 1]

where $R_1$ is hydrogen or a methyl group, and $R_2$ is a linear or branched alkyl group having at least 2 carbon atoms.

3. The touch panel according to claim 1, wherein the pressure-sensitive adhesive layer further comprises a multifunctional crosslinking agent crosslinking the acryl polymer.

4. A pressure-sensitive adhesive composition for a touch panel, comprising:
   an acryl polymer containing 5 to 28 parts by weight of isobornyl acrylate monomer, and 5 to 35 parts by weight of methyl acrylate monomer in a polymerized form, and a thiol compound,
   wherein the acryl polymer has a weight average molecular weight of 750,000 to 2,500,000,
   wherein the touch panel comprises a base including an indium tin oxide (ITO) film formed on at least one surface thereof; and a pressure-sensitive adhesive layer directly attached to the ITO film on the base,
   wherein the pressure-sensitive adhesive layer is formed from the pressure sensitive adhesive composition, and completely covers the ITO film, wherein the pressure-sensitive adhesive layer has a peel strength with respect to a polycarbonate sheet of 2,500 g/25 mm or more at a peel angle of 180 degrees, a peel rate of 300 mm/min and at room temperature, and a resistance change ratio of the ITO film of 6% or less, and wherein the thiol compound is at least one of compounds represented by Formulas 2 to 5:

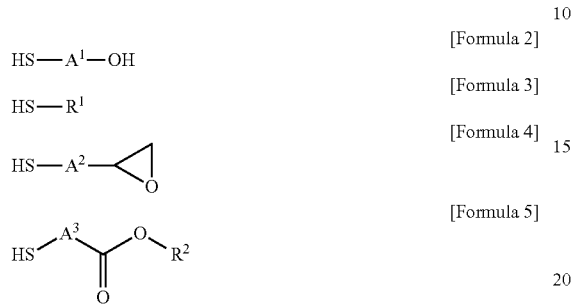

where $A^1$ to $A^3$ are independently linear or branched alkylene, $R^1$ is linear or branched alkyl, $R^2$ is hydrogen, an alkyl group or $-A^4-C(-A^5-O-C(=O)-A^6-SH)_n R_{(3-n)}$, $A^4$ to $A^6$ are independently linear or branched alkylene, R is linear or branched alkyl, and n is an integer between 1 and 3.

5. A double-sided pressure-sensitive adhesive tape for a touch panel, comprising a pressure-sensitive adhesive layer formed of the pressure-sensitive adhesive composition according to claim 4.

* * * * *